United States Patent [19]

Huntsman et al.

[11] Patent Number: 4,766,531
[45] Date of Patent: Aug. 23, 1988

[54] METHOD AND APPARATUS FOR GENERATING THE NEXT MICROADDRESS FOR A MICROMACHINE

[75] Inventors: Clayton D. Huntsman, Brandon, Fla.; Duane W. Cawthron, Austin, Tex.

[73] Assignee: Motorola, Inc., Schaumburg, Ill.

[21] Appl. No.: 852,008

[22] Filed: Apr. 14, 1986

[51] Int. Cl.⁴ .............................................. G06F 12/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,943,495 | 3/1976 | Garlic | 364/200 |
| 4,038,643 | 7/1977 | Kim | 364/200 |
| 4,155,120 | 5/1979 | Keefer et al. | 364/200 |
| 4,338,661 | 7/1982 | Tredennick | 364/200 |
| 4,392,198 | 7/1983 | Shimazaki | 364/200 |
| 4,394,735 | 7/1983 | Satoh et al. | 364/200 |
| 4,407,015 | 9/1983 | Ziobro | 364/200 |
| 4,449,184 | 5/1984 | Pohlman, III et al. | 364/200 |

OTHER PUBLICATIONS

Chapter V, "Synthesis for ROM-Centered Design", pp. 75–96.

Primary Examiner—Archie E. Williams, Jr.
Assistant Examiner—Emily Y. Chan
Attorney, Agent, or Firm—John A. Fisher; Jeffrey Van Myers

[57] ABSTRACT

The current microinstruction of a micromachine enables a selected one of a plurality of conditions to select one of a plurality of microaddress qualifiers to be combined with a specified base microaddress to form the next microaddress for the micromachine.

6 Claims, 1 Drawing Sheet

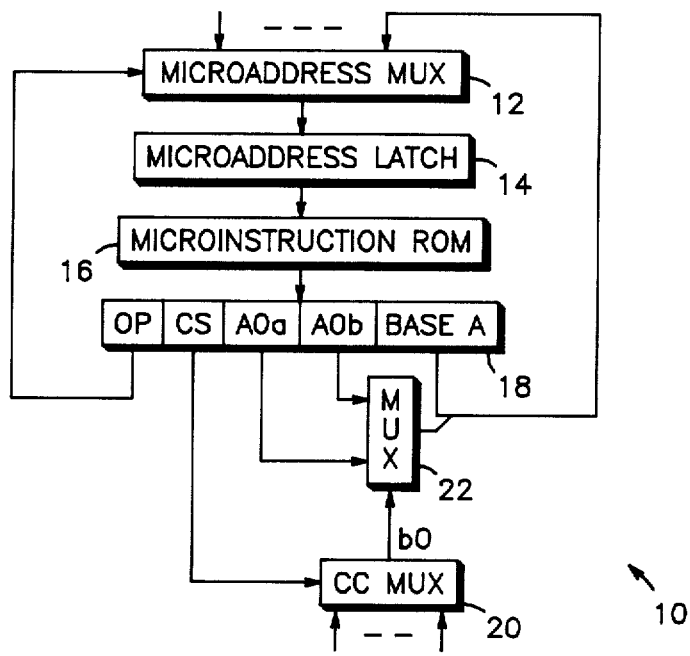
FIG. 1
FIG. 2
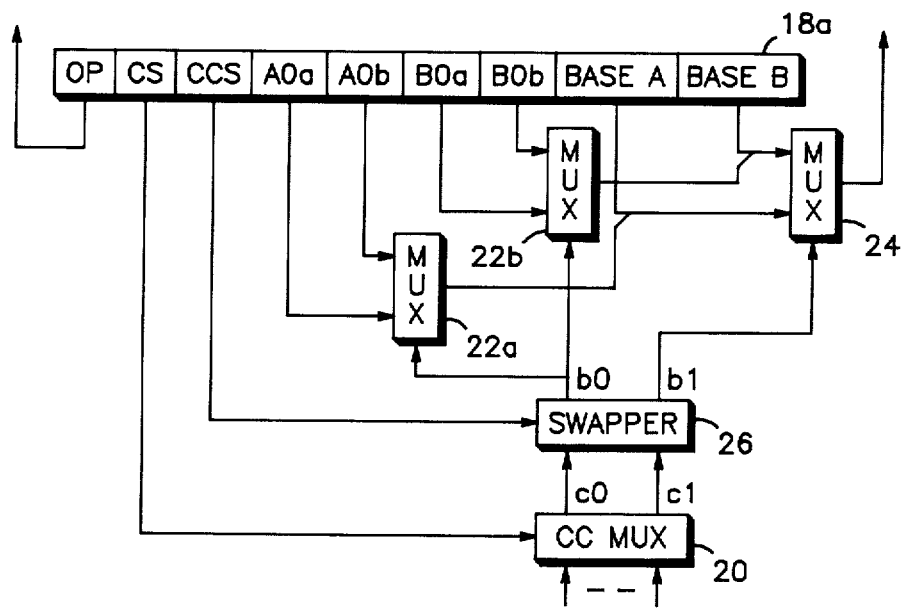

METHOD AND APPARATUS FOR GENERATING THE NEXT MICROADDRESS FOR A MICROMACHINE

TECHNICAL FIELD

This invention relates to micromachines, and, more particularly, to a method and apparatus for generating the next microaddress for a micromachine.

BACKGROUND ART

In simple micromachines, the starting microaddress for each microroutine is typically generated by instruction decoding circuitry. Sometimes, subsequent microaddresses are generated by simply incrementing the current microaddress until stopped by the last microinstruction in that particular microroutine. More often, the next microaddress comprises a next microaddress field in the current microinstruction. Usually, multiplexing circuitry selects between this next microaddress and the starting microaddress(es) under control of a microaddress select field of the current microinstruction. An example of such a micromachine is shown in FIG. 5.15 on page 81 of *DESIGNING LOGIC SYSTEMS USING STATE MACHINES* by Christopher R. Clare (McGraw-Hill 1973).

In one form of conditional branching, such as in the micromachine shown in FIG. 5.13 on page 79 of Clare (see above), each microinstruction contains alternate next microaddress fields and the current state of one or more conditions selected by a conditional branch control field of the same microinstruction determines which is selected as the next microaddress. In another form, the next microaddress field of the current microinstruction is concatenated with the conditions selected by the conditional branch control field, as in the micromachine shown in U.S. Pat. No. 4,038,643. In still another form, the conditions are used by a PLA to generate the low order microaddress bits which are then concatenated with the base microaddress, as in the micromachine shown in U.S. Pat. No. 4,338,661. In yet another form, sequencing information is stored in a separate memory, as in the micromachine shown in U.S. Pat. No. 4,155,120.

SUMMARY OF THE INVENTION

Accordingly, it is an object of the present invention to provide a method and an apparatus for generating the next microaddress for a micromachine by combining with a base microaddress comprising a field of the current microinstruction a selected one of a plurality of microaddress qualifiers comprising respective fields of the current microinstruction.

Another object of the present invention is to provide a method and an apparatus which allows a condition selected by a condition selector field of the current microinstruction to determine which of a plurality of microaddress qualifiers comprising respective fields of the current microinstruction will be combined with a base microaddress also comprising a field of the current microinstruction to produce the next microaddress for a micromachine.

These and other objects are achieved in a micromachine wherein each microinstruction includes a primary base microaddress in a first field, a first primary microaddress qualifier in a second field, a second primary microaddress qualifier in a third field, and a condition selector in a fourth field. In accordance with the preferred method and apparatus of the present invention, the next microaddress for the micromachine is generated by selecting a primary one of a plurality of current conditions based upon the condition selector, selecting one of the first and second primary microaddress qualifiers based upon the selected primary condition, combining the selected primary microaddress qualifier and the primary base microaddress to form a composite primary microaddress, the composite primary microaddress comprising the next microaddress of the micromachine. In a modified form, one (or more) additional base/qualifier set(s) can be provided and selectively enabled to generate the next microaddress. In one other form, the condition which selects between the several qualifiers can be selected independently from the condition that selects between the several combined microaddresses.

BRIEF DESCRIPTION OF THE DRAWINGS

FIG. 1 is a block diagram of a micromachine in which the next microaddress is generated in accordance with the present invention.

FIG. 2 is a block diagram of a modified form of the microaddress generation portion of the micromachine of FIG. 1 in which the next microaddress is generated in accordance with an expanded form of the present invention.

DESCRIPTION OF THE PREFERRED EMBODIMENT

In the micromachine 10 shown in FIG. 1, a plurality of microaddresses are received by a microaddress mux 12. In response to an operation signal, the microaddress mux 12 selects one of the microaddresses as the "next" microaddress to be provided to a microaddress latch 14. In response to the latched microaddress, a microinstruction read-only-memory (ROM) 16 provides a selected one of a plurality of stored microinstructions to a microinstruction latch 18. This "current" microinstruction contains the operation signal (OP) to be provided to the microaddress mux 12 to select the next microaddress, and such other customary control information (not shown) as may be necessary to control other circuitry (not shown).

In the preferred form, each microinstruction also includes the following fields:
  a primary base microaddress (BASE A);
  a first primary microaddress qualifier (A0a);
  a second primary microaddress qualifier (A0b); and
  a condition selector (CS).

As shown in FIG. 1, a plurality of current condition signals are received by a condition mux 20. In response to the condition selector, the condition mux 20 selects a primary one of the current conditions to be provided to a primary microaddress qualifier mux 22. In response to the selected primary condition, the primary microaddress qualifier mux 22 provides a selected one of the first and second primary microaddress qualifiers, A0a or A0b. This selected primary microaddress qualifier is combined with the primary base microaddress (BASE A) to form a composite primary microaddress. Depending upon the operation signal in the current microinstruction, this composite primary microaddress may be selected by the microaddress mux 12 as the next microaddress.

Thus, in addition to being able to select which of several possible microaddresses will be used as the next microaddress, each microinstruction can now select which of several current conditions will control the selection of one of two microaddress qualifiers to be combined with a specified base microaddress to form a particular one of the possible microaddresses.

If desired, a dual base form of the present invention may be provided as shown in FIG. 2. In this form, each microinstruction also includes the following additional fields:

a secondary base microaddress (BASE B);
a first secondary microaddress qualifier (B0a); and
a second secondary microaddress qualifier (B0b).

As in FIG. 1, a plurality of current condition signals are received by the condition mux 20. In response to the condition selector, the condition mux 20 selects a primary one of the current conditions to be provided to both a primary microaddress qualifier mux 22a and a secondary microaddress qualifier mux 22b. The condition mux 20 also selects a secondary one of the current conditions to be provided to a composite microaddress selector mux 24.

In response to the selected primary condition, the primary microaddress qualifier mux 22a provides a selected one of the first and second primary microaddress qualifiers, A0a or A0b. This selected primary microaddress qualifier is combined with the primary base microaddress (BASE A) and provided to the composite microaddress selector mux 24 as the composite primary microaddress.

In response to the selected primary condition, the secondary microaddress qualifier mux 22b provides a selected one of the first and second secondary microaddress qualifiers, B0a or B0b. This selected secondary microaddress qualifier is combined with the secondary base microaddress (BASE B) and provided to the composite microaddress selector mux 24 as a composite secondary microaddress.

In response to the secondary condition, the composite microaddress selector mux 24 provides either the composite primary microaddress or the composite secondary microaddress. Depending upon the operation signal in the current microinstruction, this selected composite microaddress may be selected by the microaddress mux 12 as the next microaddress.

Thus, in addition to being able to select which of several possible microaddresses will be used as the next microaddress, each microinstruction can now select one condition which will control the selection of one of two microaddress qualifiers to be combined with a specified base microaddress to form a particular one of two composite microaddresses and another current condition which will control the selection between the two composite microaddresses.

In the illustrated form, the microinstruction also includes a control condition selector (CCS). In response to this control condition selector, a swapper 26 selectively swaps the primary and secondary conditions. In this manner, each microinstruction can independently select which selected condition controls qualifier selection and which selected condition controls the composite microaddress selection.

In the preferred form, each base microaddress comprises only the high order bits of the combined microaddress, and the microaddress qualifiers comprise one (or more) low order bits of the combined microaddress. Thus, the full microaddress is formed by concatenating the selected microaddress qualifier with the (selected) base microaddress. However, if desired, each base microaddress may comprise a full microaddress and the qualifiers may be logically combined therewith so the combined microaddress is a modified form of the base microaddress.

In some applications, it may be advantageous to provide additional base/qualifier sets in the microinstructions, and expand the condition selector and current condition mux 20 so that additional conditions select among the several alternative combined microaddresses. On the other hand, additional bases may not be required if the qualifiers are expanded in size or number so as to provide the desired number of alternative microaddress combinations.

In micromachines having branch intensive microroutines, the present invention allows the next microaddress to be resolved more rapidly than using either a PLA or a separate memory to determine the qualifier. In addition, the present invention allows multi-way branching in a manner which facilitates modifications to the microinstruction routines without requiring changes to other portions of the micromachine. In micromachines having a split level microinstruction ROM, such as in the micromachine shown in U.S. Pat. No. 4,338,661, the size penalty incurred in expanding the size of the microinstruction to accomodate the qualifier(s) may be offset by inherent benefits of the faster resolution time and greater freedom to modify the microinstruction routines.

If the micromachine is provided with a microaddress stack (not shown), as in U.S. Pat. No. 4,449,184, one of the base/qualifier pairs can be used to conditionally branch to a microinstruction subroutine and the other base/qualifier pair can be used to generate the return microaddress to be stacked. In such a form, the base/qualifier pair for the return microaddress can be resolved into the actual return microaddress before stacking or stacked "as is" so that the subroutine can itself conditionally generate the return microaddress.

We claim:

1. A method for generating the next microaddress of a micromachine, comprising the steps of:
   providing a primary base microaddress in a first field of a current microinstruction;
   providing a first primary microaddress qualifier in a second field of the current microinstruction;
   providing a second primary microaddress qualifier in a third field of the current microinstruction;
   providing a condition selector value in a fourth field of the current microinstruction;
   selecting a primary one of a plurality of current conditions in response to the condition selector value in said fourth field;
   selecting one of the first and second primary microaddress qualifiers in response to said selected one of said primary current conditions;
   combining the selected primary microaddress qualifier and the primary base microaddress to form a composite primary microaddress comprising said primary base microaddress and said selected primary microaddress qualifier;
wherein the composite primary microaddress comprises the next microaddress of the micromachine.

2. The method of claim 1 further comprising the steps of:
   providing a secondary base microaddress in a fifth field of a current microinstruction;
   providing a first secondary microaddress qualifier in a sixth field of the current microinstruction;

providing a second secondary microaddress qualifier in a seventh field of the current microinstruction;

selecting a secondary one of a plurality of current conditions in response to the condition selector value in said fourth field;

selecting one of the first and second secondary microaddress qualifiers in response to said selected one of said primary current condition;

combining the selected secondary microaddress qualifier and the secondary base microaddress to form a composite secondary microaddress comprising said secondary base microaddress and said selected secondary microaddress qualifier; and selecting either the composite primary microaddress or the composite secondary microaddress in response to said selected one of said secondary current condition;

wherein the selected second composite microaddress comprises the next microaddress of the micromachine.

3. The method of claim 2 further comprising:

providing a control condition selector value in an eighth field of the current microinstruction; and selectively swapping the selected primary and secondary current conditions in response to the control condition selector value in said eighth field.

4. Apparatus for generating the next microaddress of a micromachine comprising:

first means for latching a current microinstruction comprising:
 a primary base microaddress in a first field;
 a first primary microaddress qualifier in a second field;
 a second primary microaddress qualifier in a third field;
 a condition selector value in a fourth field;

second means for selecting a primary one of a plurality of current conditions in response to the condition selector value in said fourth field;

third means for selecting one of the first and second primary microaddress qualifiers in response to said selected one of said primary current conditions; and fourth means for combining the selected primary microaddress qualifier and the primary base microaddress to form a composite primary microaddress comprising said primary base microaddress and said selected primary microaddress qualifier;

wherein the composite primary microaddress comprises the next microaddress of the micromachine.

5. The apparatus of claim 4 wherein: the current microinstruction further comprises:
 a secondary base microaddress in a fifth field;
 a first secondary microaddress qualifier in a sixth field;
 a second secondary microaddress qualifier in a seventh field;

and the apparatus further comprises:

fifth means for selecting a secondary one of a plurality of current conditions in response to the condition selector value in said fourth field;

sixth means for selecting one of the first and second secondary microaddress qualifiers in response to the selected primary condition;

seventh means for combining the selected secondary microaddress qualifier and the secondary base microaddress to form a composite secondary microaddress comprising said secondary base microaddress and said selected secondary microaddress qualifier; and eighth means for selecting either the composite primary microaddress or the composite secondary microaddress in response to said selected one of said secondary current condition;

wherein the selected second composite microaddress comprises the next microaddress of the micromachine.

6. The apparatus of claim 5 wherein: the microinstruction further comprises:
 a control condition selector value in an eighth field;

and the apparatus further comprises:
 ninth means for selectively swapping the selected primary and secondary current conditions in response to the control condition selector value in said eighth field.

* * * * *